(12) United States Patent
Pendyala et al.

(10) Patent No.: US 12,174,946 B2
(45) Date of Patent: *Dec. 24, 2024

(54) REAL-TIME DETECTION OF SYSTEM THREATS

(71) Applicant: Rubrik, Inc., Palo Alto, CA (US)

(72) Inventors: Shanthi Kiran Pendyala, Palo Alto, CA (US); Di Wu, Newark, CA (US); Matthew Edward Noe, San Francisco, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,474

(22) Filed: Oct. 30, 2023

(65) Prior Publication Data

US 2024/0061930 A1 Feb. 22, 2024

Related U.S. Application Data

(63) Continuation of application No. 17/985,510, filed on Nov. 11, 2022, now Pat. No. 11,846,980, which is a continuation of application No. 16/263,319, filed on Jan. 31, 2019, now Pat. No. 11,599,629.

(51) Int. Cl.
| | |
|---|---|
| *G06F 9/448* | (2018.01) |
| *G06F 16/17* | (2019.01) |
| *G06F 16/174* | (2019.01) |
| *G06F 21/55* | (2013.01) |
| *G06F 21/56* | (2013.01) |
| *G06F 21/62* | (2013.01) |

(52) U.S. Cl.
CPC .......... *G06F 21/552* (2013.01); *G06F 9/4498* (2018.02); *G06F 16/1734* (2019.01); *G06F 16/1748* (2019.01); *G06F 21/56* (2013.01)

(58) Field of Classification Search
CPC .. G06F 21/552; G06F 9/4498; G06F 16/1748; G06F 16/1734
USPC .......................................................... 726/22
See application file for complete search history.

(56) References Cited

U.S. PATENT DOCUMENTS

| | | | |
|---|---|---|---|
| 8,181,247 | B1 | 5/2012 | Pavlyushchik et al. |
| 8,635,694 | B2 | 1/2014 | Malyshev et al. |
| 9,626,509 | B1 * | 4/2017 | Khalid ................... G06F 21/53 |
| 9,747,445 | B2 | 8/2017 | Friedrichs et al. |
| 10,055,582 | B1 * | 8/2018 | Weaver ................ G06F 21/562 |
| 10,083,301 | B2 | 9/2018 | Hentunen |

(Continued)

FOREIGN PATENT DOCUMENTS

| | | |
|---|---|---|
| EP | 3038003 A1 | 6/2016 |
| KR | 10-2017-0088160 A | 8/2017 |

(Continued)

OTHER PUBLICATIONS

Dae-Youb Kim; White List-based Ransomware Real-time Detection and Prevention for User Device Protection; IEEE: Year:2018; pp. 1-5.*

(Continued)

*Primary Examiner* — Monjur Rahim
(74) *Attorney, Agent, or Firm* — Holland & Hart LLP

(57) ABSTRACT

Some examples relate generally to managing and storing data, and more specifically to the real-time detection of ransomware, system (or insider) threats, or the misappropriation of credentials by using file system audit events.

20 Claims, 11 Drawing Sheets

(56) References Cited

U.S. PATENT DOCUMENTS

| | | |
|---|---|---|
| 10,230,749 B1 | 3/2019 | Rostami-Hesarsorkh et al. |
| 10,476,896 B2 | 11/2019 | Divalentin et al. |
| 10,565,376 B1* | 2/2020 | Jung ............... G06F 11/302 |
| 10,628,586 B1* | 4/2020 | Jung ............... G06F 11/3037 |
| 10,884,636 B1 | 1/2021 | Abrol et al. |
| 11,159,397 B2 | 10/2021 | Hardin et al. |
| 11,170,104 B1* | 11/2021 | Stickle ............. G06N 20/00 |
| 11,550,901 B2 | 1/2023 | Pendyala et al. |
| 11,599,629 B2 | 3/2023 | Pendyala et al. |
| 11,632,389 B2* | 4/2023 | Manthena ......... H04L 63/1425 |
| | | 726/23 |
| 2008/0115221 A1 | 5/2008 | Yun et al. |
| 2011/0016091 A1* | 1/2011 | Prahlad ............. G06F 11/1453 |
| | | 707/654 |
| 2015/0047034 A1 | 2/2015 | Burnham et al. |
| 2015/0121522 A1* | 4/2015 | Guido ............... H04W 12/12 |
| | | 726/23 |
| 2015/0154398 A1 | 6/2015 | Jones et al. |
| 2015/0230108 A1 | 8/2015 | Sridhara et al. |
| 2015/0261955 A1* | 9/2015 | Huang ............... G06F 21/567 |
| | | 726/23 |
| 2016/0253498 A1* | 9/2016 | Valencia ............ G06N 20/00 |
| | | 726/23 |
| 2016/0371170 A1* | 12/2016 | Salunke ............ G06F 11/302 |
| 2017/0116417 A1* | 4/2017 | Jhi ................... G06F 21/566 |
| 2017/0206353 A1 | 7/2017 | Jai et al. |
| 2017/0251003 A1 | 8/2017 | Rostami-Hesarsorkh et al. |
| 2018/0054453 A1* | 2/2018 | Astigarraga ......... H04L 63/16 |
| 2018/0060579 A1* | 3/2018 | Stepan ............... G06F 21/54 |
| 2018/0074976 A1* | 3/2018 | Norris ............... G06F 12/1441 |
| 2018/0107824 A1 | 4/2018 | Gibbons et al. |
| 2018/0211040 A1 | 7/2018 | Patton et al. |
| 2018/0219894 A1 | 8/2018 | Crabtree et al. |
| 2018/0219896 A1* | 8/2018 | Kokko ............... H04L 63/1425 |
| 2018/0248896 A1 | 8/2018 | Challita et al. |
| 2018/0307839 A1 | 10/2018 | Bhave et al. |
| 2019/0042744 A1* | 2/2019 | Rajasekharan ....... G06F 21/554 |
| 2019/0097902 A1* | 3/2019 | Hardin ............... H04L 43/0817 |
| 2019/0108340 A1* | 4/2019 | Bedhapudi ........... G06F 21/554 |
| 2019/0108341 A1 | 4/2019 | Bedhapudi et al. |
| 2019/0109870 A1* | 4/2019 | Bedhapudi .......... H04L 63/0428 |
| 2019/0124030 A1* | 4/2019 | Pierce ................ H04L 63/126 |
| 2019/0163900 A1 | 5/2019 | Zhang et al. |
| 2019/0222597 A1 | 7/2019 | Crabtree et al. |
| 2019/0303575 A1 | 10/2019 | Chelarescu et al. |
| 2019/0332766 A1 | 10/2019 | Guri et al. |
| 2019/0391749 A1* | 12/2019 | Holt ................. G06F 3/0604 |
| 2020/0004961 A1 | 1/2020 | Prokudin et al. |
| 2020/0034537 A1 | 1/2020 | Chen et al. |
| 2020/0036743 A1 | 1/2020 | Almukaynizi et al. |
| 2020/0042703 A1 | 2/2020 | Herman et al. |
| 2020/0097650 A1 | 3/2020 | Golan et al. |
| 2020/0204589 A1 | 6/2020 | Strogov et al. |
| 2020/0236121 A1 | 7/2020 | Spurlock et al. |
| 2020/0250305 A1 | 8/2020 | Pendyala et al. |
| 2020/0349427 A1* | 11/2020 | Sousa ................ G06N 3/084 |
| 2021/0034393 A1* | 2/2021 | Wu ................... G06F 11/1453 |
| 2021/0117377 A1 | 4/2021 | Savir et al. |

FOREIGN PATENT DOCUMENTS

| | | |
|---|---|---|
| WO | 2018/111271 A1 | 6/2018 |
| WO | 2020/160085 A1 | 8/2020 |
| WO | 2020/160086 A1 | 8/2020 |

OTHER PUBLICATIONS

Chansu Han; Real-Time Detection of Malware Activities by Analyzing Darknet Traffic Using Graphical Lasso; IEEE: 2018; pp. 144-151.

Denning, An Intrusion-Detection Model, 1986 IEEE Symposium on Security and Privacy, Apr. 7-9, 1986, 14 pgs.

International Search Report and Written Opinion received for PCT Patent Application No. PCT/US20/15574, mailed on May 22, 2020, 10 pages.

International Search Report and Written Opinion received for PCT Patent Application No. PCT/US20/15576, mailed on May 21, 2020, 9 pages.

Lu et al., Ransomware Detection Based on V-detector Negative Selection Algorithm, 2017 International Conference on Security, Patent Analysis and Cybernetics (SPAC), 978-1-5386-3016-7/17, 2017 IEEE, 6 pages.

Mehnaz et al., Building Robust Temporal User Profiles for Anomaly Detection in File System Accesses, 2016 14th Annual Conference on Privacy, Security and Trust (PST), Dec. 12-14, 2016, 4 pgs.

Toffalini et al., Detection of Masqueraders Based on Graph Partitioning of File System Access Events, 2018 IEEE Symposium on Security and Privacy Workshops (SPW), May 21-23, 2018, 11 pgs.

* cited by examiner

REAL-TIME DETECTION OF SYSTEM THREATS

RELATED APPLICATIONS

This application is a continuation of U.S. patent application Ser. No. 17/985,510, filed Nov. 11, 2022, and entitled "REAL-TIME DETECTION OF SYSTEM THREATS," which is a continuation of U.S. patent application Ser. No. 16/263,319, filed Jan. 31, 2019, and entitled "REAL-TIME DETECTION OF SYSTEM THREATS," each of which is assigned to the assignee hereof and each of which is hereby incorporated in its entirety by reference herein.

FIELD

The present disclosure relates generally to managing and storing data, and more specifically to the real-time detection of ransomware, system (or insider) threats, and the misappropriation of credentials by using file system audit events.

BACKGROUND

The amount and type of data that is collected, analyzed and stored is increasing rapidly over time. The compute infrastructure used to handle this data is also becoming more complex, with more processing power and more portability. As a result, data management and storage are increasingly important. One aspect of this is reliable data backup and storage, and fast data recovery in cases of failure. Another aspect is data portability across locations and platforms.

At the same time, ransomware has become a major cyber-security threat over the past few years. In this regard, data security regulations such as those mandated in the General Data Protection Regulation 2016/679 (GDPR) place strict notification obligations on data holders. The GDPR is a regulation in EU law relating to data protection and privacy for all individuals within the European Union and the European Economic Area. The regulation also addresses the export of personal data outside the EU and EEA areas, such as into the United States. Under the GDPR regulation, if there is a data breach the data holder is required to notify all affected users very quickly. Thus, the rapid detection of ransomware or unauthorized access to data is critical.

Conventional attempts to solve these challenges have drawbacks. For example, signature-based ransomware detection is ineffective because ransomware can avoid detection by using different signatures. In addition, behavioral analysis-based approaches tax computational resources. In any large organization with multiple disparate file systems, protecting against ransomware invasion is a resource-consuming task. Status-based detection systems that look for system changes at specified time intervals as evidence of possible misappropriation do not operate in real time and do not solve the technical challenge of how to provide rapid notification after a ransomware event. Moreover, status-based systems do not typically identify an affected user or unauthorized actor in any event.

SUMMARY

A Network Attached Storage (NAS) system is a storage device connected to a network that allows storage and retrieval of data from a centralized location for authorized network users and heterogeneous clients. Most NAS systems provide a method to generate audit events whenever files on a shared folder are created, read, written, or deleted. Examples of the present disclosure capture, de-duplicate ("de-dupe"), and analyze these file system audit events to identify anomalous activity such as ransomware, insider-threats (e.g., actions of a rogue employee), and misappropriation of credentials.

In an example embodiment, a system for the real-time detection of a ransomware infection in file systems is provided. The system may comprise: at least one processor for executing machine-readable instructions; and a memory storing instructions configured to cause the at least one processor to perform operations comprising, at least: accessing audit events in a file system during a time interval, the audit events including unique and duplicative file operations within the time interval; de-duplicating the audit events to remove selected duplicative file operations and generate time series data comprising unique file operations devoid of duplicative file operations; analyzing the time series data to determine whether a subset of the unique file operations includes delete instructions to delete files corresponding to the subset of unique file operations; determining that the delete instructions in the subset of unique file operations are abnormal in the time interval based on determining a pattern or number of the delete instructions in the time interval and comparing the pattern or number of the delete instructions to a normal pattern or number of delete instructions; responsive to determining that the delete instructions in the subset of unique file operations are abnormal, determining that the file system is infected with ransomware; and generating an alert.

In another example embodiment, a system for the real-time detection of an anomaly in file systems relating to a potential system threat is provided. The system may comprise: at least one processor for executing machine-readable instructions; and a memory storing instructions configured to cause the at least one processor to perform operations comprising, at least: accessing audit events in a file system during a time interval, the audit events including unique and duplicative file operations within the time interval; de-duplicating the audit events to remove selected duplicative file operations and generate time series data comprising unique file operations devoid of duplicative file operations; analyzing the time series data to determine whether a subset of the unique file operations includes file-read instructions to copy files corresponding to the subset of unique file operations; determining that the file-read instructions in the subset of unique file operations are abnormal in the time interval based on determining a pattern or number of the file-read instructions in the time interval and comparing the pattern or number of the file-read instructions to a normal pattern or number of file-read instructions; responsive to determining that the file-read instructions in the subset of unique file operations are abnormal, determining that the file system is subject to a system threat; and generating an alert.

In another example embodiment, a system for the real-time detection of an anomaly in file systems relating to a potential misuse of system credentials is provided. The system may comprise: at least one processor for executing machine-readable instructions; and a memory storing instructions configured to cause the at least one processor to perform operations comprising, at least: accessing audit events in a file system during a time interval, the audit events including unique and duplicative file operations within the time interval; de-duplicating the audit events to remove selected duplicative file operations and generate time series data comprising unique file operations devoid of duplicative file operations; analyzing the time series data to determine whether a subset of the unique file operations includes file-access instructions to access files corresponding to the subset of unique file operations, the files protected by system credentials; determining that the file-access instructions in the subset of unique file operations are abnormal in the time interval based on determining a pattern or number of the file-access instructions in the time interval and comparing the pattern or number of the file-access instructions to a normal pattern or number of file-access instructions; responsive to determining that the file-access instructions in the subset of unique file operations are abnormal, determining that the file system is vulnerable to a misuse of system credentials; and generating an alert.

DESCRIPTION OF THE DRAWINGS

Some embodiments are illustrated by way of example and not limitation in the figures of the accompanying drawings.

DESCRIPTION

Figure 1:
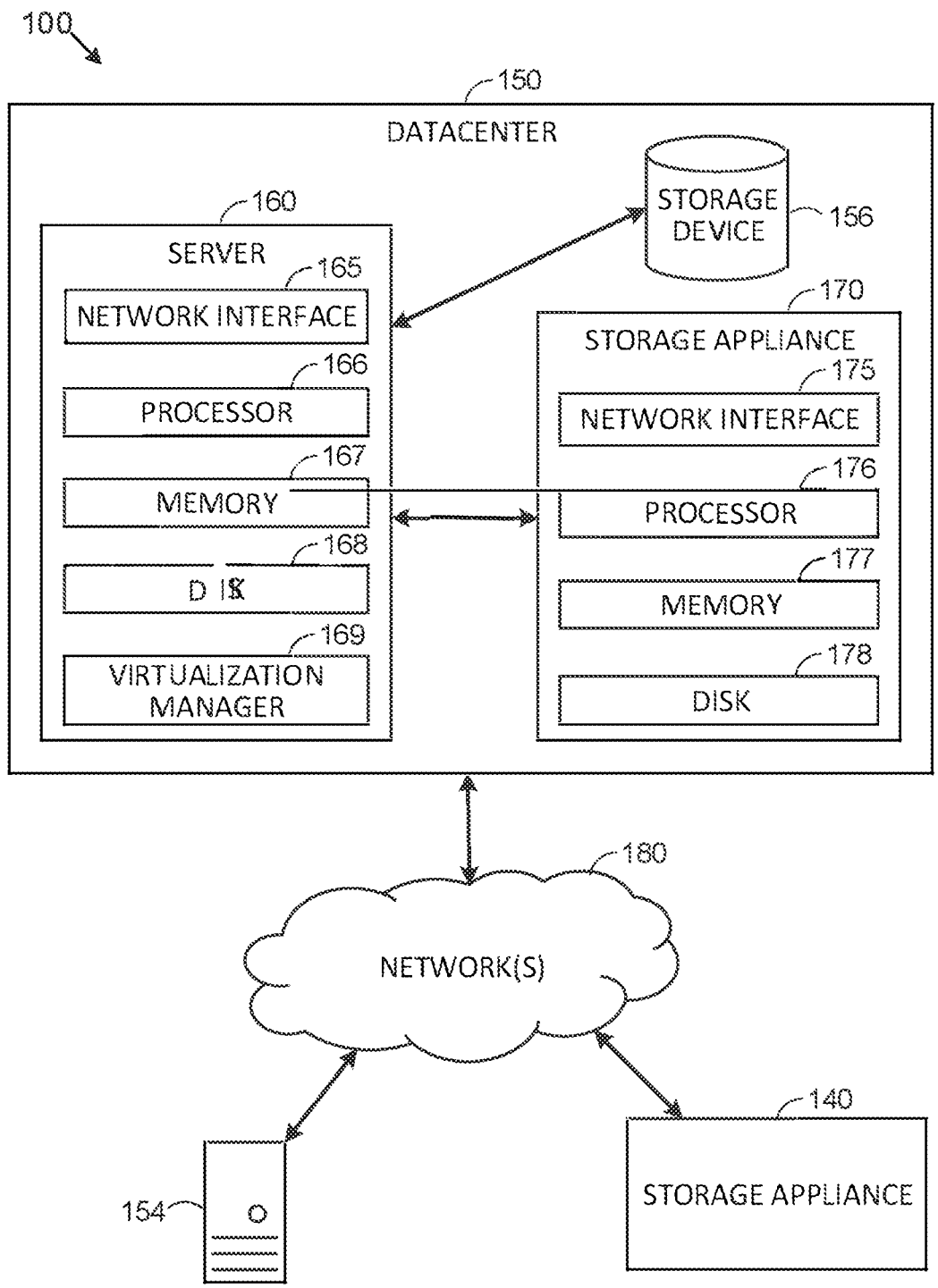
FIG. 1 depicts one embodiment of a networked computing environment 100 in which the disclosed technology may be practiced, according to an example embodiment.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present invention may be practiced without these specific details.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Rubrik, Inc., 2018-2019, All Rights Reserved.

FIG. 1 depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The storage appliance 170 may include a data management system for backing up virtual machines and/or files within a virtualized infrastructure. The server 160 may be used to create and manage one or more virtual machines associated with a virtualized infrastructure.

The one or more virtual machines may run various applications, such as a database application or a web server. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a Networked-Attached Storage (NAS) device. In some cases, a data center, such as data center 150, may include thousands of servers and/or data storage devices in communication with each 50 other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients.

One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance, such as storage appliance 170. Setting the virtual machine into a frozen state may allow a point in time snapshot of the virtual machine to be stored or transferred. In one example, updates made to a virtual machine that has been set into a frozen state may be written to a separate file (e.g., an update file) while the virtual d may be set into a read-only state to prevent modifications to the virtual disk file while the virtual machine is in the frozen state.

The virtualization manager 169 may then transfer data associated with the virtual machine (e.g., an image of the virtual machine or a portion of the image of the virtual disk file associated with the state of the virtual disk at the point in time is frozen. The virtual disk file machine) to a storage appliance in response to a request made by the storage appliance. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of 1000 virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business-related applications to a computing device, such as computing device 154. The storage appliance 140 may comprise a cloud-based data management system for backing up virtual machines and/or files within a virtualized infrastructure, such as virtual machines running on server 160 or files stored on server 160.

In some cases, networked computing environment 100 may provide remote access to secure applications and files stored within data center 150 from a remote computing device, such as computing device 154. The data center 150 may use an access control application to manage remote access to protected resources, such as protected applications, databases, or files located within the data center. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point in time versions of one or more virtual machines running within the data center 150.

A snapshot of a virtual machine may correspond with a state of the virtual machine at a particular point in time. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

Figure 2:
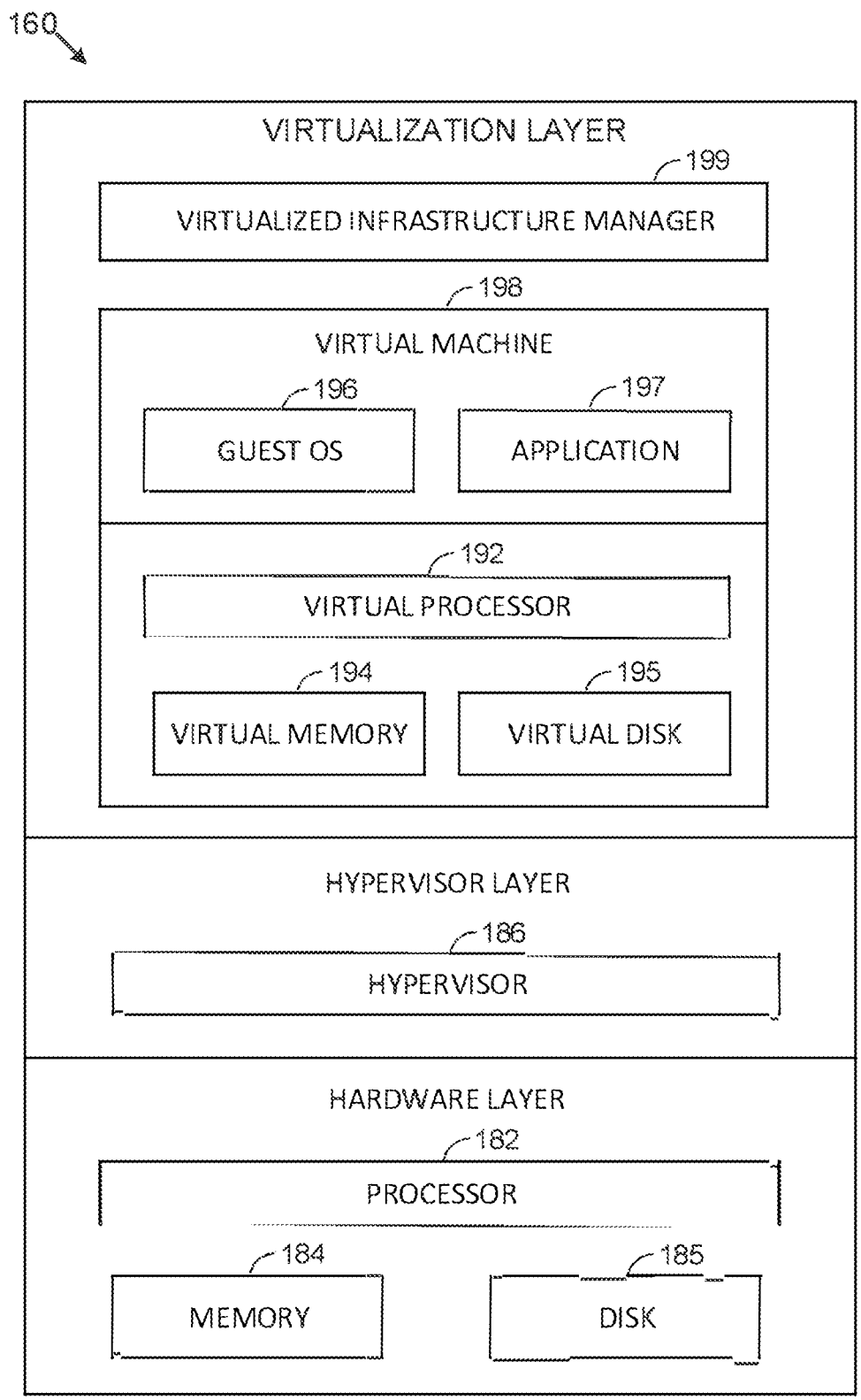
FIG. 2 depicts one embodiment of server 160 in FIG. 1, according to an example embodiment.

FIG. 2 depicts one embodiment of server 160 in FIG. 1. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure related tasks, such as cloning virtual machines, creating new virtual machines, monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1 or storage appliance 170 in FIG. 1, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 may or the hypervisor 186 may communicate with a storage appliance, such as storage appliance 140 in FIG. 1 or storage appliance 170 in FIG. 1, using a distributed file system protocol such as Network File System (NFS) Version 3, or Server Message Block (SMB) protocol. The distributed file system protocol may allow the server 160 or the hypervisor 186 to access, read, write, or modify files stored on the storage appliance as if the files were locally stored on the server. The distributed file system protocol may allow the server 160 or the hypervisor 186 to mount a directory or a portion of a file system located within the storage appliance.

Figure 3:
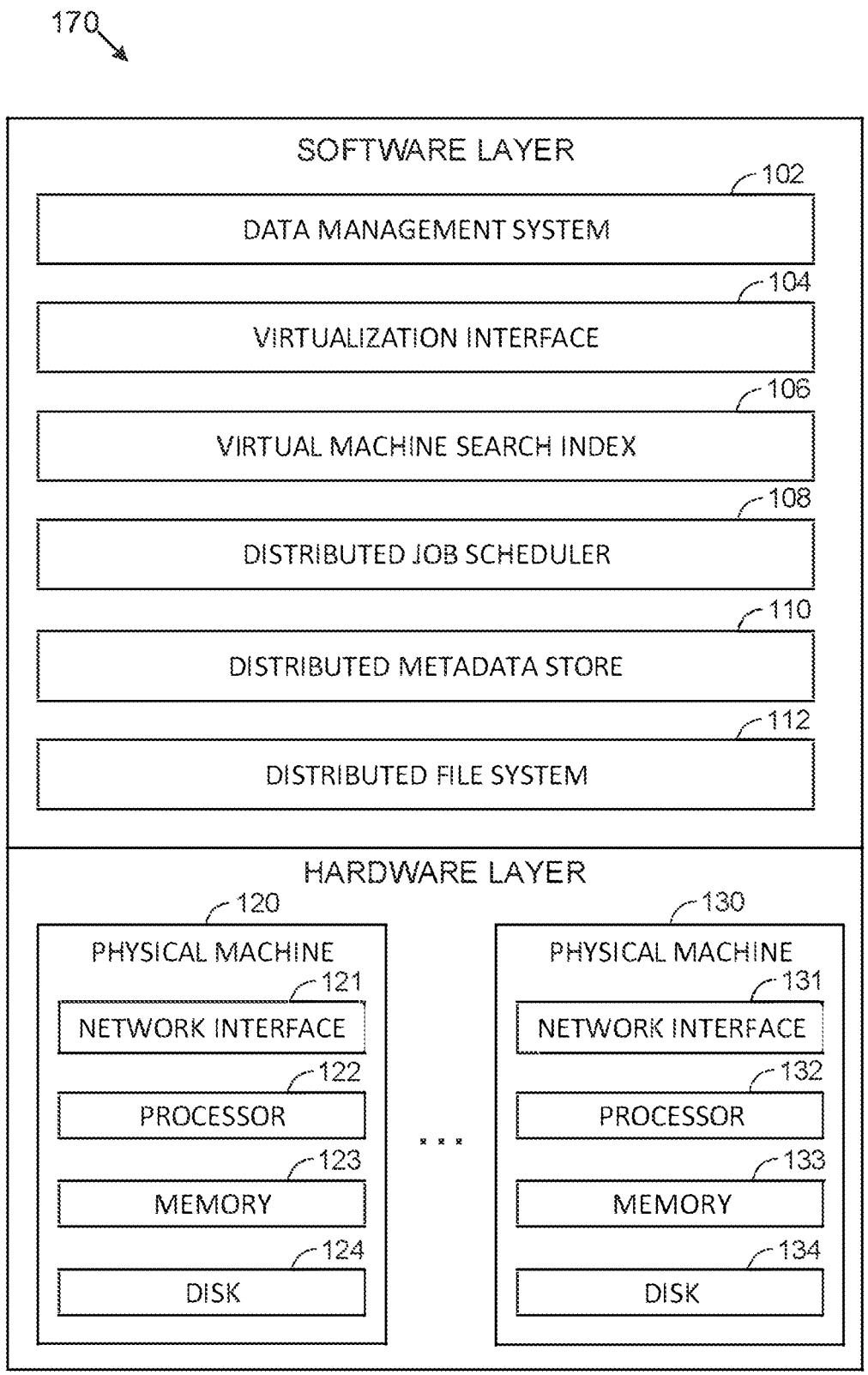
FIG. 3 depicts one embodiment of storage appliance 170 in FIG. 1, according to an example embodiment.

FIG. 3 depicts one embodiment of storage appliance 170 in FIG. 1. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1, or a hypervisor, such as hypervisor 186 in FIG. 2, to communicate with the storage appliance 170 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 2 may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of nodeG) may be G-i) modulo N. In another example, given a number (N) of nodes in a cluster from node(0) to node(N−1), for a floating IP address (i), the VRRP priority of nodeG) may be (i-j) modulo N. In these cases, nodeG) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in/snapshots/VM_A/s1/and a second snapshot of Virtual Machine A may reside in/snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks or shards. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document-oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this case, only a single full image needs to be stored and each version of the virtual machine may be generated from the single full image or the single full image combined with a subset of the one or more incremental aspects. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated 20 with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be 30 executed on a particular node in a cluster based on the location of data required to be accessed by the one or more tasks.

In one embodiment, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG. 2, to create a frozen copy of the virtual machine and to transfer one or more chunks (or one or more files) associated with the frozen copy to a storage appliance, such as storage appliance 170 in FIG. 1. The one or more tasks may also include generating metadata for the one or more chunks, storing the metadata using the distributed metadata store 110, storing the one or more chunks within the distributed file system 112, and communicating with the virtualized infrastructure manager that the virtual machine the frozen copy of the virtual machine may be unfrozen or released for a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 112 (e.g., the first chunk is located at/snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 104 may provide an interface for communicating with a virtualized infrastructure manager managing a virtualization infrastructure, such as virtualized infrastructure manager 199 in FIG. 2, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that include the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 3.

The data management system 102 may comprise an application running on the storage appliance that manages and stores one or more snapshots of a virtual machine. In one example, the data management system 102 may comprise a highest-level layer in an integrated software stack running on the storage appliance. The integrated software stack may include the data management system 102, the virtualization interface 104, the distributed job scheduler 108, the distributed metadata store 110, and the distributed file system 112.

In some cases, the integrated software stack may run on other computing devices, such as a server or computing device 154 in FIG. 1. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

As mentioned above, a Network Attached Storage (NAS) system is a storage device connected to a network that allows storage and retrieval of data from a centralized location for authorized network users and heterogeneous clients. Most NAS filers provide a method to generate audit events whenever files on a shared folder are created, read, written, or deleted. Examples of the present disclosure capture, de-duplicate ("de-dupe"), and analyze these file system audit events to identify anomalous activity such as ransomware, insider-threats (e.g., actions of a rogue employee), and misappropriation of credentials.

Figure 4:
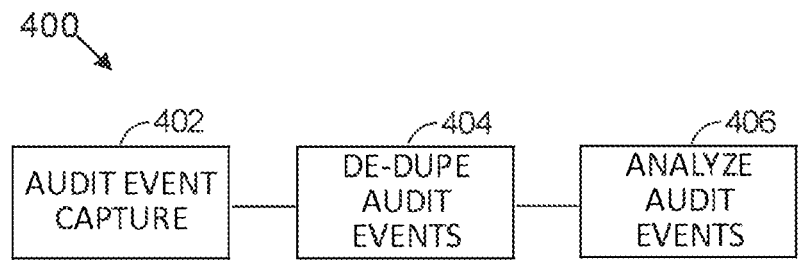
FIG. 4 depicts a block flow chart indicating example operations in a method of the present disclosure, according to an example embodiment.

Viewed broadly, FIG. 4 provides a block flow chart indicating example steps in a method 400 of the present disclosure to detect ransomware or other anomalies in a file system of the type described further above with reference to FIG. 1, for example. An NAS device may be included in a storage device, for example a storage device 156 described above. The NAS device 156 may generate audit events. At operation 402, an audit event is captured by implementing a file system auditing configuration on one or more NAS filers and setting an appropriate audit policy on the files and folders within the file system stored in the NAS device 156. Operation 402 generates audit events including user-log or file system metadata information such as user id, file name, type of access and timestamp. At operation 404, a de-dupe operation is performed. For example, in this regard a typical enterprise may see tens of millions of file access events every day, but some embodiments of the present disclosure seek to identify only a unique, specific, or pattern of access to a file by a user in the course of detecting an anomalous event. De-duplication logic associated with operation 404 filters out similar information (e.g., same user-id, same file) to reduce the subsequent audit event load in operation 406. At operation 406, an analysis audit of the de-duped events may be performed based on certain heuristics to detect anomalous events in the files or folders in the file system.

Example heuristics or problem-solving techniques may include the following. A ransomware attack typically encrypts copies of all of a user's files and deletes the unencrypted original files. An example heuristic to detect this activity is to track audit event metadata over time and watch for a large of file deletions occurring in a short period of time. Similarly, insider threats (also termed system threats herein) such as damaging actions of a disgruntled employee, or the copying of many files before departure can be detected by noticing a spike in the number of files read (copied) in a short period of time. The misappropriation of credentials can be detected by comparing a normal pattern of user file access with a sudden and large number of new files accessed within a short period of time. Other examples identify file accesses at odd (abnormal, or unexpected) hours of the day, for example outside office hours. Access to or the misappropriation of credentials may be flagged in some embodiments based on an anomaly in both file reads per user and unusual access times.

Figure 5:
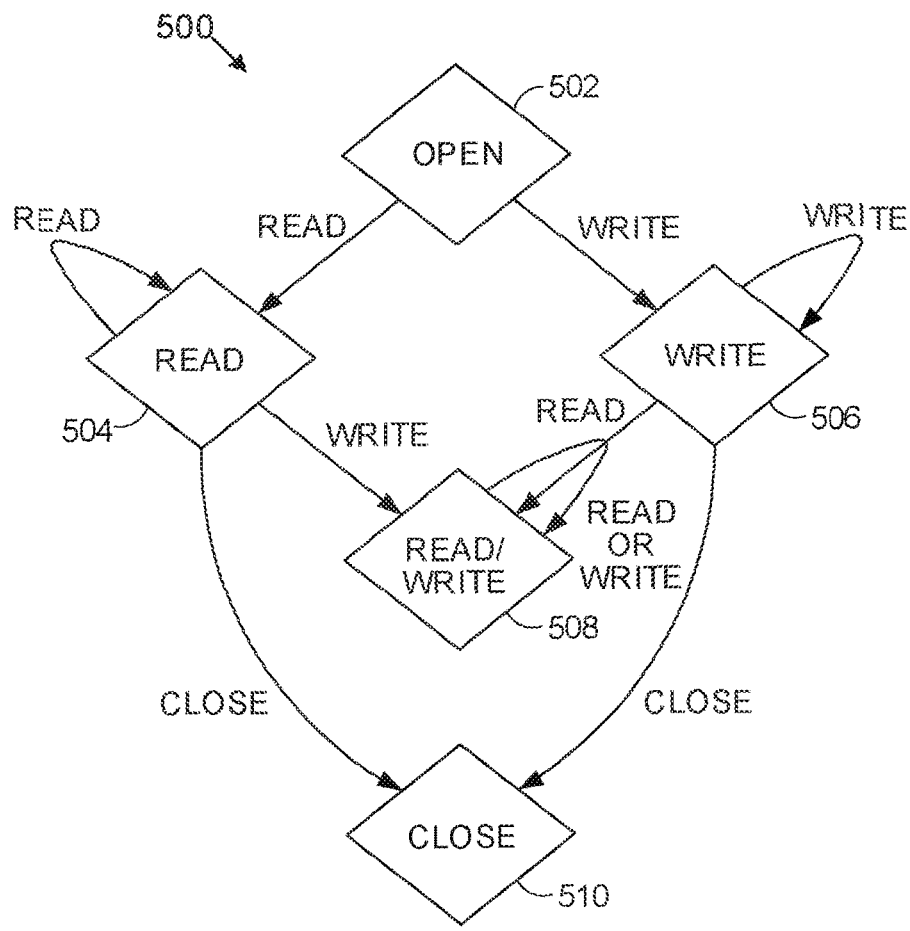
FIG. 5 illustrates example aspects of a de-duplication operation, according to an example embodiment.

Reference is now made to FIG. 5 which illustrates further example aspects of the de-dupe operation 404. In some examples, a finite state machine de-dupes file system audit events for use in data governance and anomaly detection. An example finite state machine may be constituted by or include an audit event object store. The finite state machine may be included in the data management system 102 described above. A typical user editing a Word document within the system files or folders for example may generate many write or read events as the user edits the document. Example embodiments of the present disclosure are interested only in the fact that the user edited the document once within a given timeframe and each of the additional audit events which repeat this information is unnecessary for purposes of detecting anomalies of the type described herein, such as the real-time detection of ransomware. The focus on an individual audited event within a given timeframe helps to reduce noise and the great number of audit events that the finite state machine would otherwise have to store and process.

A state map 500 is maintained depicting a state of the finite state machine. An example state 500 may perform state mapping and store or include a (user_id, file_path) state of a file. An example file may include the Word document discussed in the example above. A state 500 of the file may be represented in real-time in the finite state machine as shown in FIG. 5 and include example states such as file open state 502, a file read state 504, a file write state 506, a file read/write state 508, and a file close state 510. The file states 502-510 may be memorialized or stored by the data management system 102 in a key-value object store.

In some examples, the de-dupe operation 404 occurs in the {read, write, read/write} states as follows. Once a (user_id, file_name) enters any of the states, successive events that do not lead to a change in state will be de-duped. For example, if the system has seen (userX, fileY) ⇨{open, read} events followed by another read event, the second read event and any succeeding read events will be de-duped because the (user_id, file_path) does not advance to another state in the finite state machine.

There is some information value if the same (user_id, file_path) ⇨{open, read} state event occurs many hours apart, for example, as the file could have changed in the interim. In some examples, the de-dupe logic is therefore relaxed to de-dupe events only occurring within a relatively short period of time, for example, 15 minutes or 1-hour as may be configured by a user. Other time periods are possible. In some examples, a clean map 500 may be started after every 15 minutes or 1-hour time period, respectively.

Further example aspects of the analysis audit operation 406 are now described. In some embodiments, detected anomalies include ransomware, insider threat and the misappropriation (or mere existence) of credentials. Some embodiments of the present disclosure apply Seasonal-Trend Decomposition Procedure Based on Loess (STL) decomposition to remove seasonal and trend components and use the residue to detect anomalies. STL is a filtering procedure for decomposing a time series into trend, seasonal, and remainder components. STL has a simple design that includes a sequence of applications of the Loess smoother. The simplicity allows analysis of the properties of a procedure and allows fast computation, even for longtime series and high levels of trend and seasonal smoothing. Other features of STL allow the specification of amounts of seasonal and trend smoothing that may range in a nearly continuous way from a very small amount of smoothing to a very large amount of smoothing. STL also allows robust estimates of the trend and seasonal components that are not distorted by aberrant behavior in the data, the specification of the period of the seasonal component to any integer multiple of the time sampling interval greater than one, and the ability to decompose time series with missing values.

Some embodiments of the present disclosure apply an Exploratory Data Analysis (ESD) test to detect outliers (or anomalies). An outlier may be an observation that deviates so much from other observations as to arouse suspicions that it was generated by a different mechanism. An outlier may point to the existence of ransomware, insider threat or the misappropriation (or mere existence) of credentials In some examples, the STL decomposition and/or ESD test may be used to generate time series data for the purpose of detecting anomalous user activity using certain features. An example feature may include a file delete. Here, an example embodiment may count the number of file deletes per user every day and collect this count for a month to generate the time series data. Other time periods are possible. The example embodiment may limit file deletes to human readable files such as Word documents, Excel files, PDF files, source code files and the like, and ignore machine-generated files such as XML, JSON, and so forth.

A further example feature may include a file read. Here, an example embodiment may count the number of unique file reads on a per user basis every day and collect this count over one month to generate the time series data. Other time periods are possible. Another example feature may include an access time. Here, an example embodiment may generate two (or more) time series by counting file accesses per user on hourly and daily basis over a month. Other time periods are possible. An example time series may show non-zero values during normal business hours and zero (or very low) values during weekends and off-peak hours. An example embodiment may flag detection of an anomaly on a positive deviation from a time series (i.e. the observed value is greater than the historical count, not less). This approach seeks to filter out inactivity due to holidays, paid time off and so forth. A deviation from this observed behavior can be flagged as an anomaly. Some example embodiments may declare a ransomware attack based on an anomaly in the count of file deletes as discussed above. Some example embodiments may flag an insider threat based on an anomaly in file reads per user. Access to or the misappropriation of credentials may be flagged in some embodiments based on an anomaly in both file reads per user and unusual access times.

Figure 6:
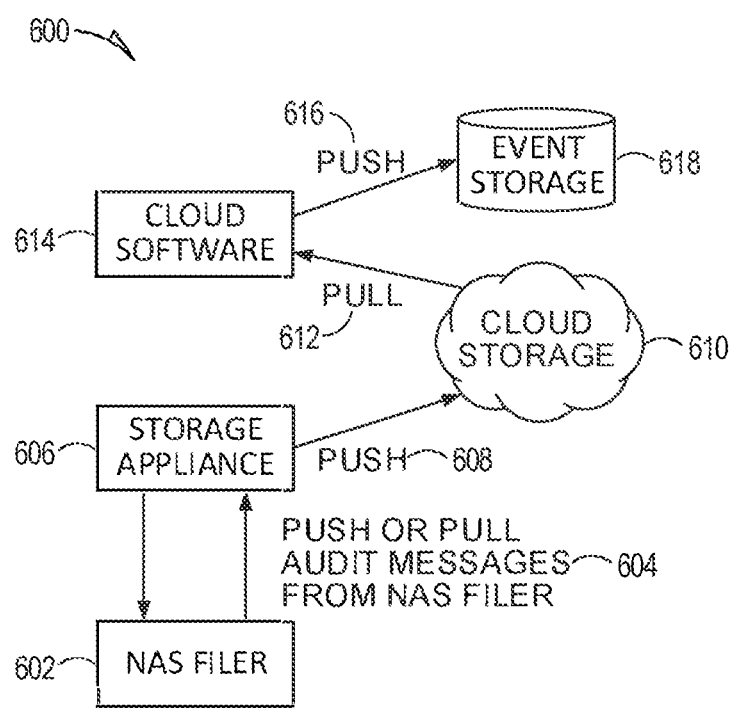
FIG. 6 illustrates a data pipeline, according to an example embodiment.

FIG. 6 illustrates a data pipeline 600 according to an example embodiment. The data pipeline 600 includes an NAS filer 602. The data may include audit messages or events. As mentioned above, a Network Attached Storage (NAS) system is a storage device connected to a network that allows storage and retrieval of data from a centralized location for authorized network users and heterogeneous clients. Most NAS filers provide a method to generate audit events whenever files on a shared folder are created, read, written, or deleted. Examples of the present disclosure capture, de-duplicate ("de-dupe"), and analyze these file system audit events to identify anomalous activity such as ransomware, insider-threats (e.g., actions of a rogue employee), and misappropriation of credentials.

In the illustrated data pipeline 600, at operation 604 a storage appliance 606 pushes or pulls audit messages to or from the NAS filer 602. At operation 608, the storage appliance 606 pushes data to a cloud storage 610. At operation 612, cloud software 614 pulls data from the cloud storage 610. At operation 616, the cloud software 614 pushes data to an event store 618. The event store 618 may include a finite state machine constituted by or including an audit event object store.

Figure 7:
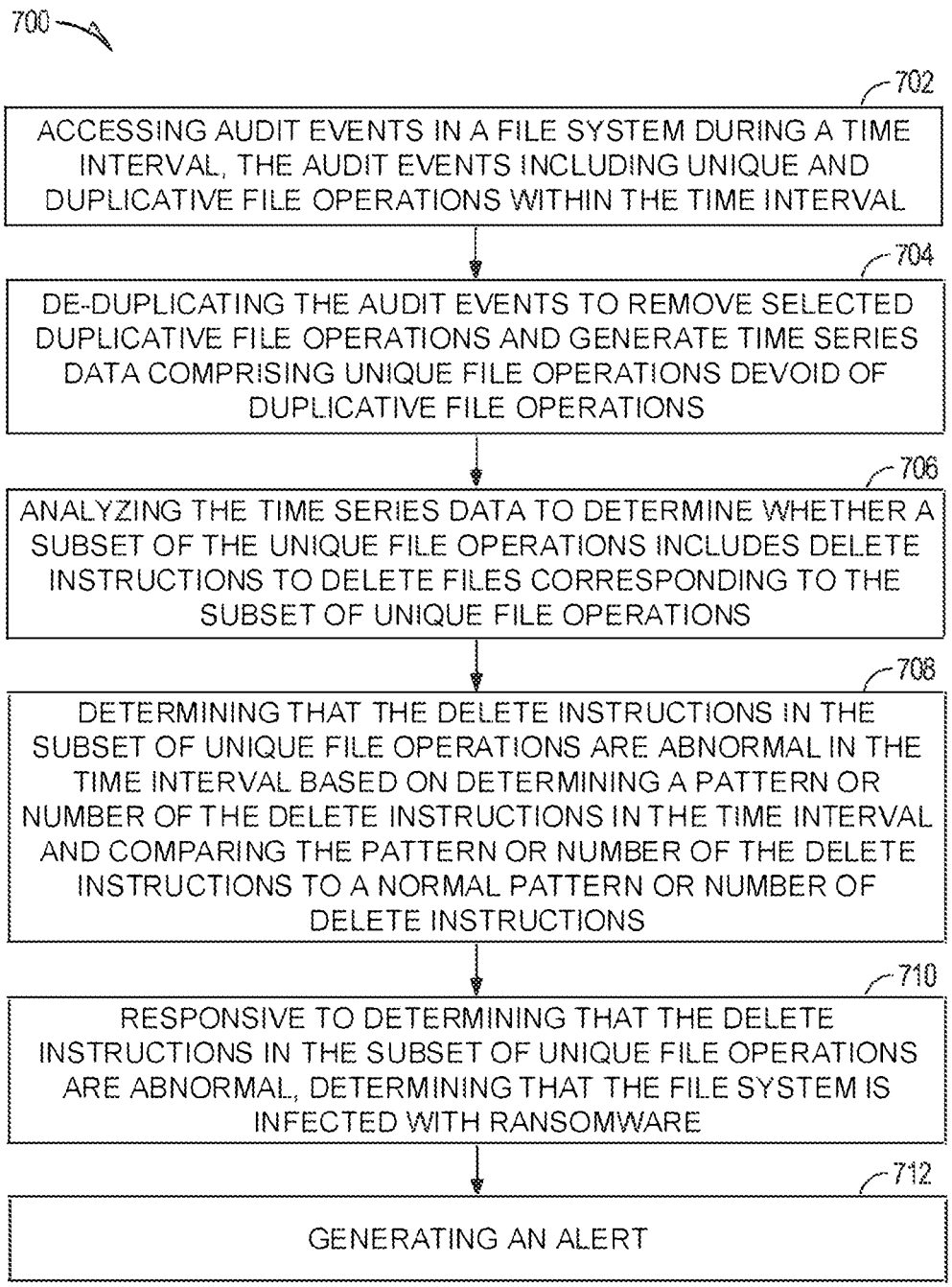
FIGS. 7-9 depict block flow charts indicating example operations in methods of the present disclosure, according to example embodiments.

Some embodiments of the present disclosure include methods. With reference to FIG. 7, an example method 700 for the real-time detection of ransomware may include, at operation 702, accessing audit events in a file system during a time interval, the audit events including unique and duplicative file operations within the time interval; at operation 704, de-duplicating the audit events to remove selected duplicative file operations and generate time series data comprising unique file operations devoid of duplicative file operations; at operation 706, analyzing the time series data to determine whether a subset of the unique file operations includes delete instructions to delete files corresponding to the subset of unique file operations; at operation 708, determining that the delete instructions in the subset of unique file operations are abnormal in the time interval based on determining a pattern or number of the delete instructions in the time interval and comparing the pattern or number of the delete instructions to a normal pattern or number of delete instructions; at 710, responsive to determining that the delete instructions in the subset of unique file operations are abnormal, determining that the file system is infected with ransomware; and, at operation 712, generating an alert.

In some examples, the audit events include information comprising, for each audit event, a user id, a file name, a type of access, and a timestamp.

In some examples, the method 700 further comprises determining whether the subset of the file operations includes instructions to encrypt copies of the deleted files corresponding to the subset of file operations, and to delete the unencrypted original files.

In some examples, the selection of duplicative file operations for removal in the de-duplication of the audit events is based at least in part on an identification of successive file operations that do not lead to a change in a file state.

In some examples, the method 700 further comprises generating a finite state machine including one or more file states, the file states including a file open state, a file read state, a file write state, a file read/write state, and a file close state; and storing the file states in the finite state machine in a key value object store.

In some examples, determining whether the delete instructions in the subset of the file operations files are abnormal comprises applying a set of machine learning models to the audit events, the set of machine learning models trained to determine the pattern or number of the file operations and to compare the pattern or number of the file operations to the normal pattern or number based on features representing a normal or expected behavior of the file system.

In some examples, de-duplicating the audit events includes maintaining a file system state based on the finite state machine.

In some examples, determining that the delete instructions in the subset of the file operations are abnormal comprises applying Seasonal-Trend Decomposition Procedure Based on Loess (STL) decomposition to file delete audit events to remove seasonal and trend components and using a residue of the decomposition to generate the time series data, and performing an Exploratory Data Analysis (ESD) test on the time series data.

Figure 8:
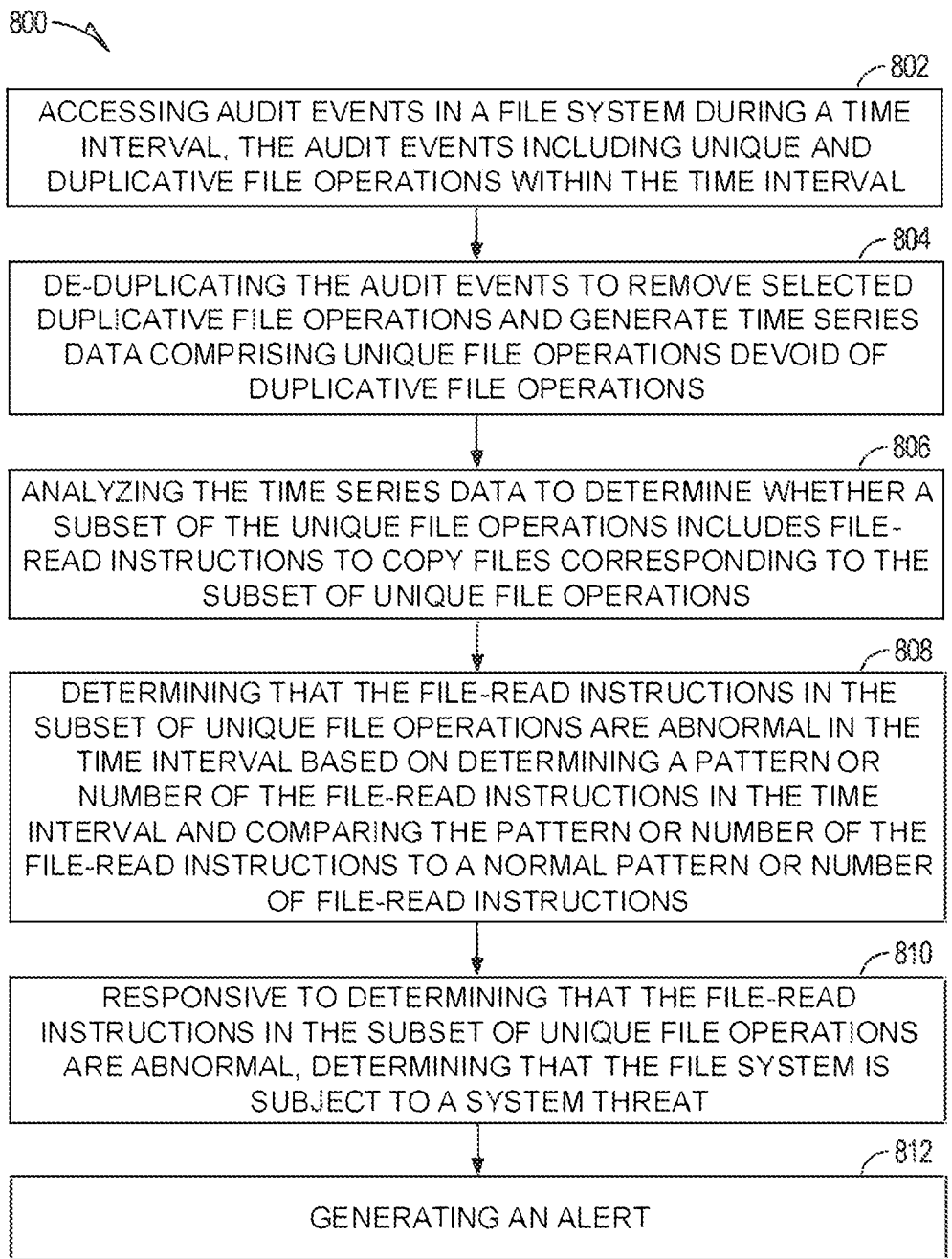

With reference to FIG. 8, an example method 800 for the real-time detection of an anomaly in file systems relating to a potential system threat, may include, at operation 802, accessing audit events in a file system during a time interval, the audit events including unique and duplicative file operations within the time interval; at operation 804, de-duplicating the audit events to remove selected duplicative file operations and generate time series data comprising unique file operations devoid of duplicative file operations; at operation 806, analyzing the time series data to determine whether a subset of the unique file operations includes file-read instructions to copy files corresponding to the subset of unique file operations; at operation 808, determining that the file-read instructions in the subset of unique file operations are abnormal in the time interval based on determining a pattern or number of the file-read instructions in the time interval and comparing the pattern or number of the file-read instructions to a normal pattern or number of file-read instructions; at operation 810, responsive to determining that the file-read instructions in the subset of unique file operations are abnormal, determining that the file system is subject to a system threat; and at operation 812, generating an alert.

In some examples, the audit events include information comprising, for each audit event, a user id, a file name, a type of access, and a timestamp.

In some examples, the selection of duplicative file operations for removal in the de-duplication of the audit events is based at least in part on an identification of successive file operations that do not lead to a change in a file state.

In some examples, the method 800 further comprises generating a finite state machine including one or more file states, the file states including a file open state, a file read state, a file write state, a file read/write state, and a file close state; and storing the file states in the finite state machine in a key-value object store.

In some examples, determining whether the file-read instructions in the subset of the file operations files are abnormal comprises applying a set of machine learning models to the audit events, the set of machine learning models trained to determine the pattern or number of the file operations and to compare the pattern or number of the file operations to the normal pattern or number based on features representing a normal or expected behavior of the file system.

In some examples, de-duplicating the audit events includes maintaining a file system state based on the finite state machine.

In some examples, determining that the file-read instructions in the subset of the file operations are abnormal comprises applying Seasonal-Trend Decomposition Procedure Based on Loess (STL) decomposition to file delete audit events to remove seasonal and trend components and using a residue of the decomposition to generate the time series data, and performing an Exploratory Data Analysis (ESD) test on the time series data.

Figure 9:
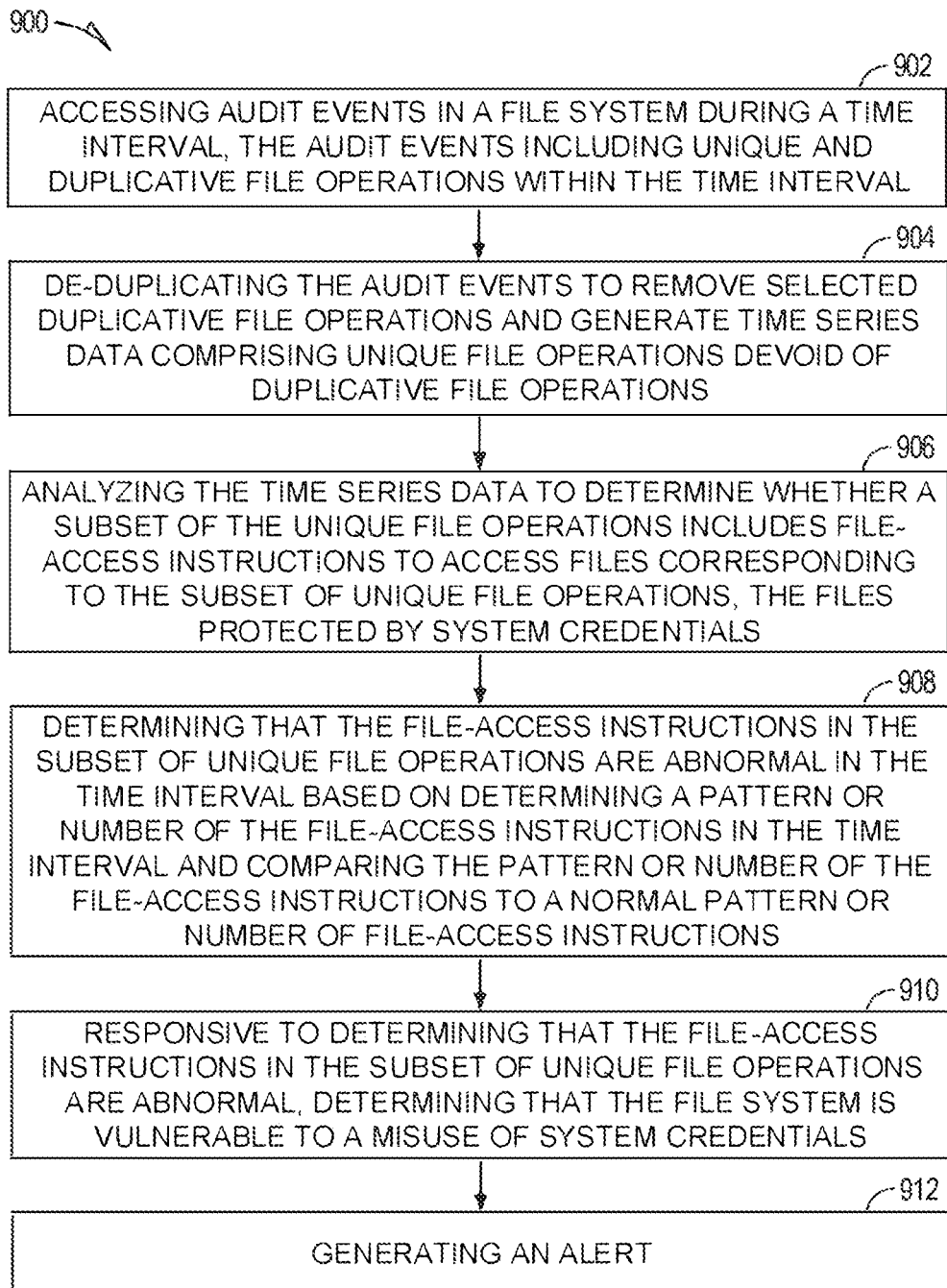

With reference to FIG. 9, an example method 900 for the real-time detection of an anomaly in file systems relating to a potential misuse of system credentials may include, at operation 902, accessing audit events in a file system during a time interval, the audit events including unique and duplicative file operations within the time interval; at operation 904, de-duplicating the audit events to remove selected duplicative file operations and generate time series data comprising unique file operations devoid of duplicative file operations; at operation 906, analyzing the time series data to determine whether a subset of the unique file operations includes file-access instructions to access files corresponding to the subset of unique file operations, the files protected by system credentials; at operation 908, determining that the file-access instructions in the subset of unique file operations are abnormal in the time interval based on determining a pattern or number of the file-access instructions in the time interval and comparing the pattern or number of the file-access instructions to a normal pattern or number of file-access instructions; at operation 910, responsive to determining that the file-access instructions in the subset of unique file operations are abnormal, determining that the file system is vulnerable to a misuse of system credentials; and, at operation 912, generating an alert.

In some examples, the audit events include information comprising, for each audit event, a user id, a file name, a type of access, and a timestamp.

In some examples, the selection of duplicative file operations for removal in the de-duplication of the audit events is based at least in part on an identification of successive file operations that do not lead to a change in a file state.

In some examples, the method 900 further comprises generating a finite state machine including one or more file states, the file states including a file open state, a file read state, a file write state, a file read/write state, and a file close state; and storing the file states in the finite state machine in a key value object store.

In some examples, determining whether the file-read instructions in the subset of the file operations files are abnormal comprises applying a set of machine learning models to the audit events, the set of machine learning models trained to determine the pattern or number of the file operations and to compare the pattern or number of the file operations to the normal pattern or number based on features representing a normal or expected behavior of the file system.

In some examples, de-duplicating the audit events includes maintaining a file system state based on the finite state machine.

In some examples, determining that the file-access instructions in the subset of the file operations are abnormal comprises applying Seasonal-Trend Decomposition Procedure Based on Loess (STL) decomposition to file delete audit events to remove seasonal and trend components and using a residue of the decomposition to generate the time series data, and performing an Exploratory Data Analysis (ESD) test on the time series data.

Figure 10:
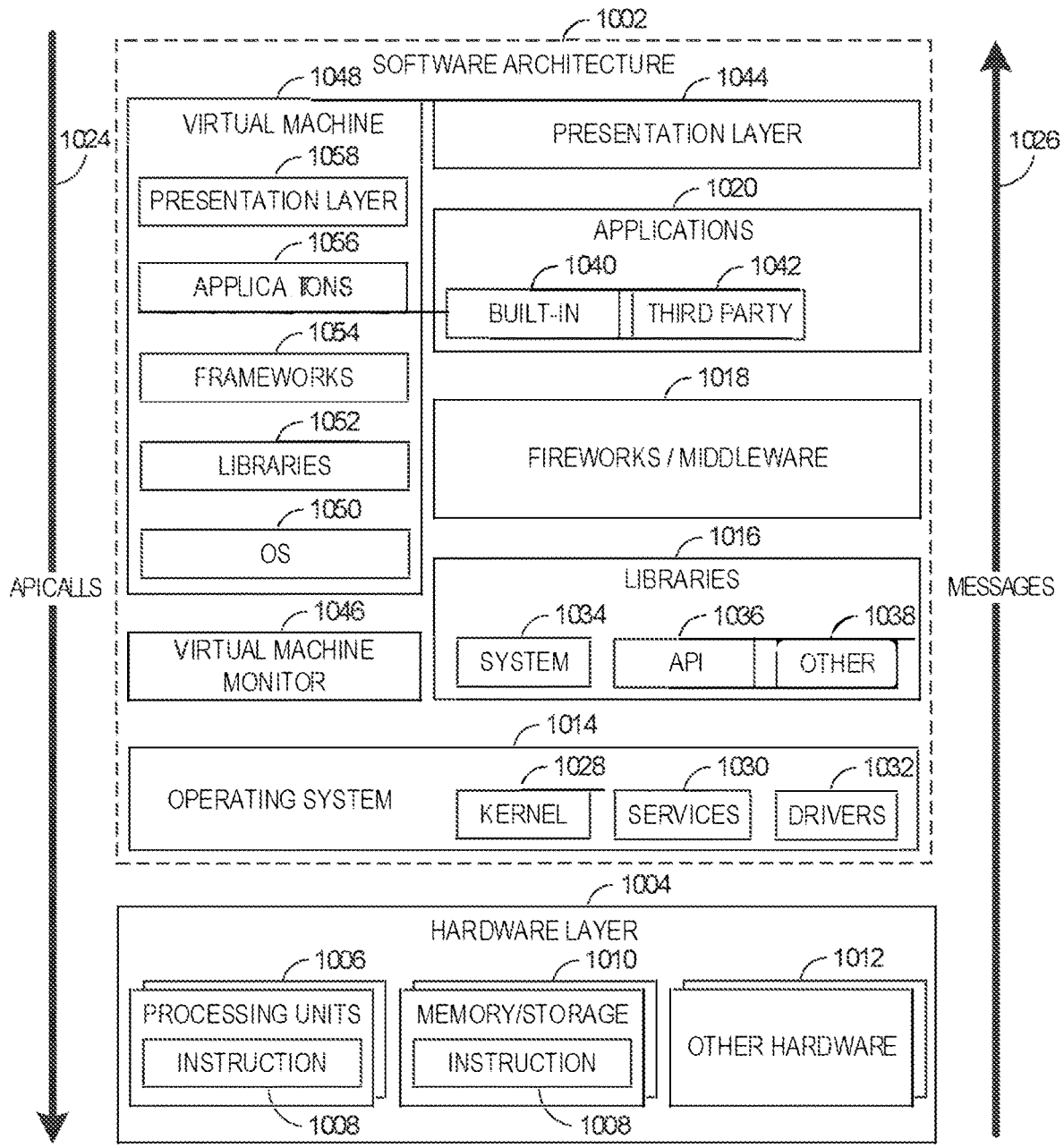
FIG. 10 depicts a block diagram illustrating an example of a software architecture that may be installed on a machine, according to some example embodiments.

FIG. 10 is a block diagram illustrating an example of a software architecture that may be installed on a machine, according to some example embodiments. FIG. 10 is merely a non-limiting example of a software architecture, and it will be appreciated that many other architectures may be implemented to facilitate the functionality described herein. The software architecture 1002 may be executing on hardware such as a machine 1200 of FIG. 12 that includes, among other things, processors 1110, memory 1130, and I/O components 1150. A representative hardware layer 1004 is illustrated and can represent, for example, the machine 1200 of FIG. 12. The representative hardware layer 1004 comprises one or more processing units 1006 having associated executable instructions 1008. The executable instructions 1008 represent the executable instructions of the software architecture 1002, including implementation of the methods, modules, and so forth described herein. The hardware layer 1004 also includes memory or storage modules 1010, which also have the executable instructions 1008. The hardware layer 1004 may also comprise other hardware 1012, which represents any other hardware of the hardware layer 1004, such as the other hardware illustrated as part of the machine 1000.

In the example architecture of FIG. 10, the software architecture 1002 may be conceptualized as a stack of layers, where each layer provides particular functionality. For example, the software architecture 1002 may include layers such as an operating system 1014, libraries 1016, frameworks/middleware 1018, applications 1020, and a presentation layer 1044. Operationally, the applications 1020 or other components within the layers may invoke API calls 1024 through the software stack and receive a response, returned values, and so forth (illustrated as messages 1026) in response to the API calls 1024. The layers illustrated are representative in nature, and not all software architectures have all layers. For example, some mobile or special purpose operating systems may not provide a frameworks/middleware 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than by interfacing directly with the underlying operating system 1014 functionality (e.g., kernel 1028, services 1030, or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) may provide a higher-level common infrastructure that may be utilized by the applications 1020 or other software components/modules. For example, the frameworks 1018 may provide various graphic user interface (GUI) functions, high-level resource management, high-level location services, and so forth. The frameworks 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a home application, a contacts application, a browser application, a book reader application, a location application, a media application, a messaging application, or a game application.

The third-party applications 1042 may include any of the built-in applications 1040, as well as a broad assortment of other applications. In a specific example, the third-party applications 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party applications 1042 may invoke the API calls 1024 provided by the mobile operating system such as the operating system 1014 to facilitate functionality described herein.

The applications 1020 may utilize built-in operating system functions (e.g., kernel 1028, services 1030, or drivers 1032), libraries (e.g., system 1034, APIs 1036, and other libraries 1038), or frameworks/middleware 1018 to create user interfaces to interact with users of the system. Alternatively, or additionally, in some systems, interactions with a user may occur through a presentation layer, such as the presentation layer 1044. In these systems, the application/module "logic" can be separated from the aspects of the application/module that interact with the user.

Some software architectures utilize virtual machines. In the example of FIG. 10, this is illustrated by a virtual machine 1048. A virtual machine creates a software environment where applications/modules can execute as if they were executing on a hardware machine e.g., the machine 1200 of FIG. 12, for example). A virtual machine 1048 is hosted by a host operating system (e.g., operating system 1014) and typically, although not always, has a virtual machine monitor 1046, which manages the operation of the virtual machine 1048 as well as the interface with the host operating system (e.g., operating system 1014). A software architecture executes within the virtual machine 1048, such as an operating system 1050, libraries 1052, frameworks/middleware 1054, applications 1056, or a presentation layer 1058. These layers of software architecture executing within the virtual machine 1048 can be the same as corresponding layers previously described or may be different.

Figure 11:
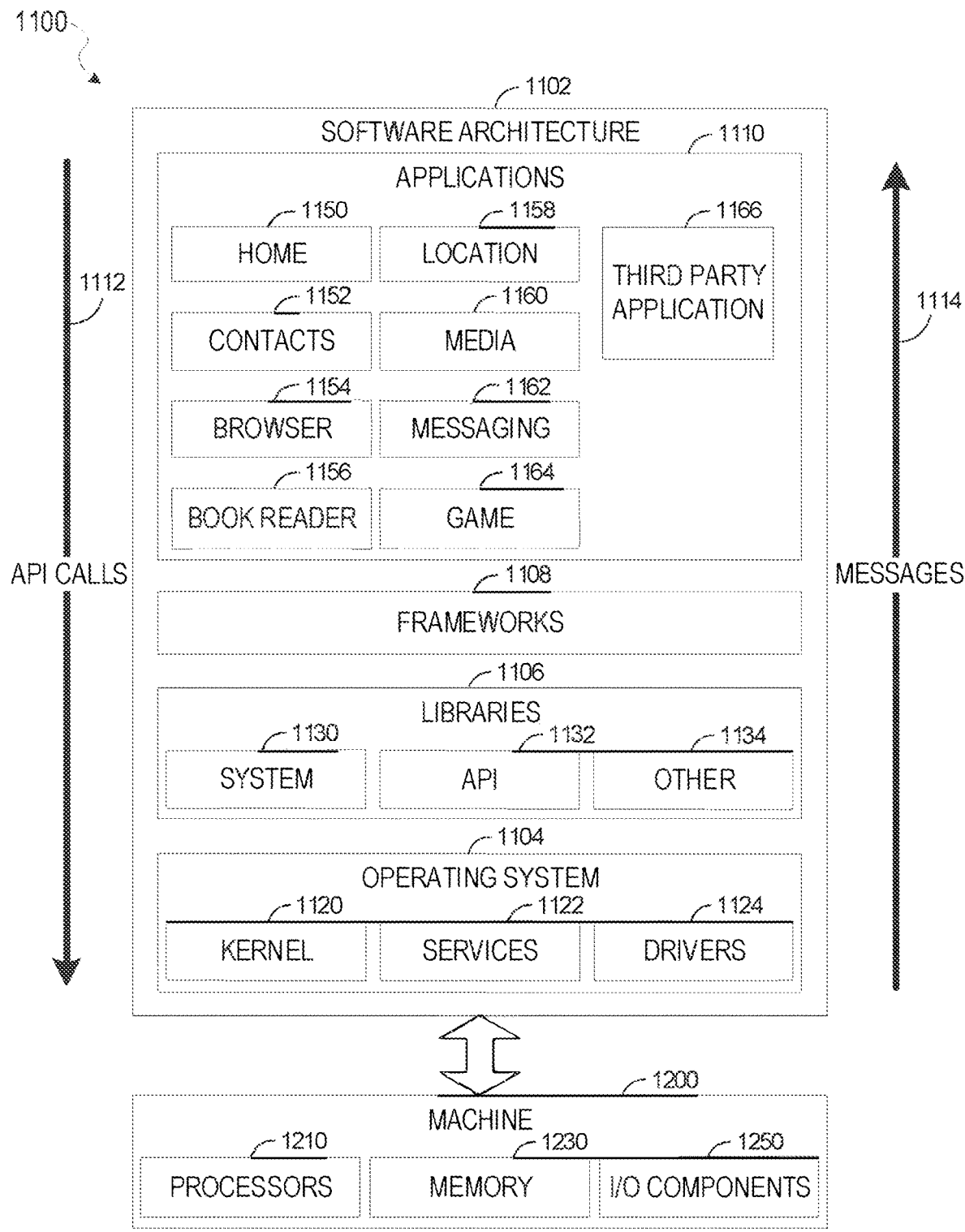
FIG. 11 depicts a block diagram 1000 illustrating an architecture of software 1002, according to an example embodiment.

FIG. 11 is a block diagram 1100 illustrating an architecture of software 1102, which can be installed on any one or more of the devices described above. FIG. 11 is merely a non-limiting example of a software architecture, and it will be appreciated that many other architectures can be implemented to facilitate the functionality described herein. In various embodiments, the software 1102 is implemented by hardware such as a machine 1200 of FIG. 12 that includes processors 1110, memory 1130, and I/O components 1150. In this example architecture, the software 1102 can be conceptualized as a stack of layers where each layer may provide a particular functionality. For example, the software 1102 includes layers such as an operating system 1104, libraries 1106, frameworks 1108, and applications 1110. Operationally, the applications 1110 invoke application programming interface (API) calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface (GUI) functions, high-level resource management, high-level location services, and so forth. The frameworks 1108 can provide a broad spectrum of other APIs that can be utilized by the applications 1110, some of which may be specific to a particular operating system or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as a third-party application 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third-party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1166 can invoke the API calls 1112 provided by the operating system 1104 to facilitate functionality described herein.

Figure 12:
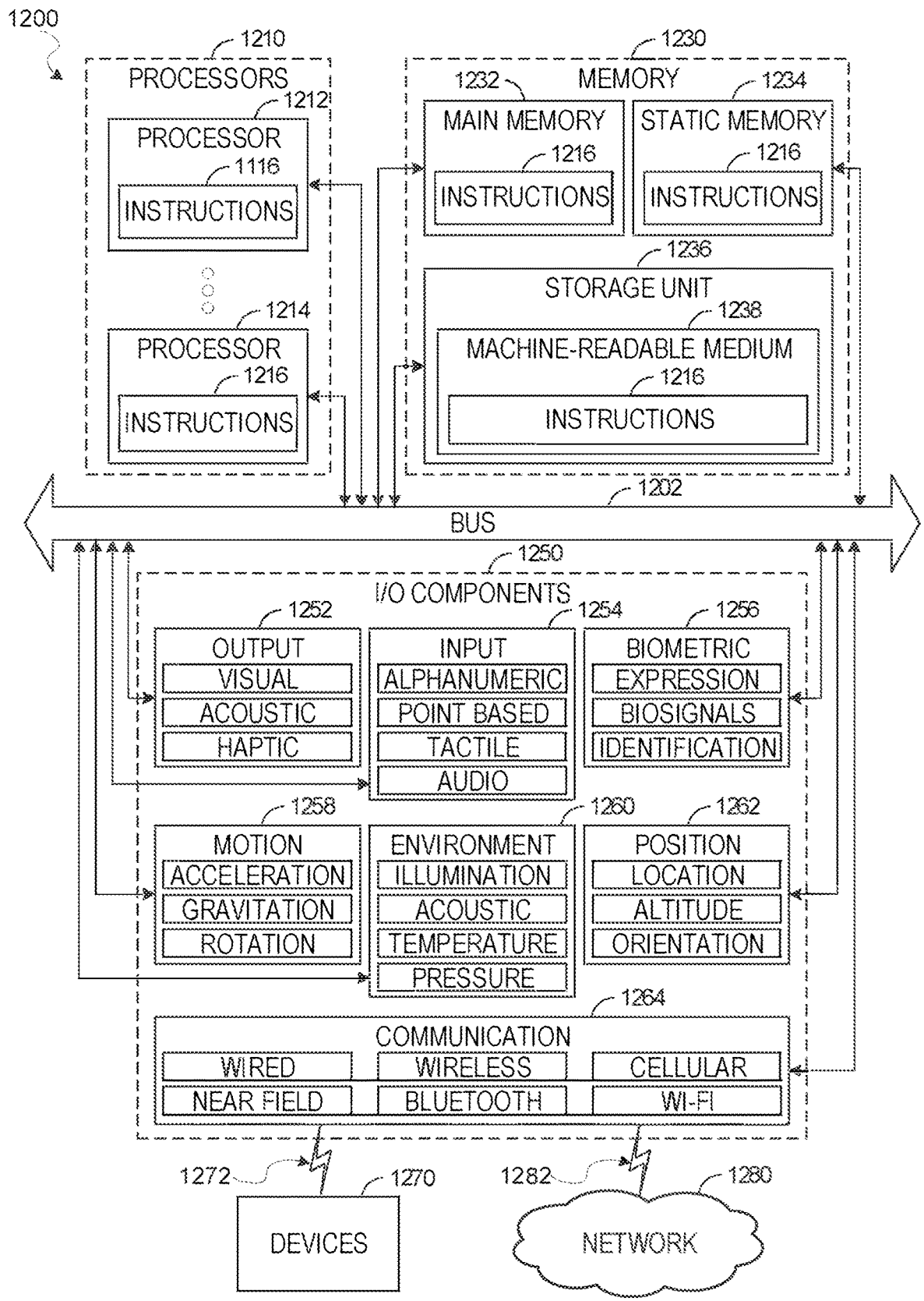
FIG. 12 illustrates a diagrammatic representation of a machine 1100 in the form of a computer system within which a set of instructions may be executed for causing a machine to perform any one or more of the methodologies discussed herein, according to an example embodiment.

FIG. 12 illustrates a diagrammatic representation of a machine 1200 in the form of a computer system within which a set of instructions may be executed for causing the machine to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. Additionally, or alternatively, the instructions 1216 may implement the operations of the methods shown in FIGS. 7-9, or as elsewhere described herein. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1212 and a processor 1214 that may execute the instructions 1216. The term "processor" is intended to include multi-core processors that may comprise two or more independent processors (sometimes referred to as "cores") that may execute instructions contemporaneously. Although FIG. 12 shows multiple processors 1210, the machine 1200 may include a single processor with a single core, a single processor with multiple cores (e.g., a multi-core processor), multiple processors with a single core, multiple processors with multiples cores, or any combination thereof.

The memory 1230 may include a main memory 1232, a static memory 1234, and a storage unit 1236, both accessible to the processors 1210 such as via the bus 1202. The main memory 1230, the static memory 1234, and storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

The various memories (i.e., 1230, 1232, 1234, and/or memory of the processor(s) 1210) and/or storage unit 1236 may store one or more sets of instructions and data structures (e.g., software) embodying or utilized by any one or more of the methodologies or functions described herein. These instructions (e.g., the instructions 1216), when executed by processor(s) 1210, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1280 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method, comprising:
   accessing audit events in a file system for a time interval, the audit events including unique file operations and duplicative file operations within the time interval;
   de-duplicating the audit events to obtain time series data that comprises the unique file operations and is devoid of the duplicative file operations from the audit events, the unique file operations being operations associated with respective changes in file states for corresponding files of the file system and the duplicative file operations being operations that maintain respective file states for corresponding files of the file system;
   comparing a pattern of instructions associated with the unique file operations of the time series data, the pattern of instructions associated with a quantity of the unique file operations occurring within a time period, to a normal pattern of instructions;
   determining, based at least in part on the comparing, that the pattern of instructions associated with the unique file operations is abnormal based at least in part on a deviation between the pattern of instructions and the normal pattern of instructions; and
   generating an alert based at least in part on determining that the pattern of instructions associated with the unique file operations is abnormal.

2. The method of claim 1, wherein the audit events include information comprising, for each audit event, a user identity, a file name, a type of access, a timestamp, or any combination thereof.

3. The method of claim 1, wherein determining that the pattern of instructions is abnormal is further based at least in part on determining that the unique file operations include instructions to encrypt one or more copies of at least one file.

4. The method of claim 1, wherein determining that the pattern of instructions is abnormal comprises:
   determining that the unique file operations comprise a set of delete instructions that deviates from a normal pattern of delete instructions, a set of read instructions that deviates from a normal pattern of read instructions, a set of file access instructions that deviates from a normal pattern of file access instructions, or any combination thereof.

5. The method of claim 4, wherein the set of delete instructions deviates from the normal pattern of delete instructions based at least in part on a quantity of delete instructions included in the set of delete instructions, the set of read instructions deviates from the normal pattern of read instructions based at least in part on a quantity of read instructions included in the set of read instructions, or the set of file access instructions deviates from the normal pattern of file access instructions based at least in part on a quantity of file access instructions included in the set of file access instructions.

6. The method of claim 4, further comprising:
   identifying a ransomware infection, one or more insider threats, a misappropriation of system credentials, or any combination thereof based at least in part on the set of delete instructions, the set of read instructions, the set of file access instructions, or any combination thereof.

7. The method of claim 1, wherein de-duplicating the audit events is based at least in part on an identification of successive file operations that do not lead to a change in a file state.

8. The method of claim 1, further comprising:
   identifying the duplicative file operations based at least in part on the duplicative file operations maintaining file states associated with corresponding prior file operations.

9. The method of claim 1, further comprising:
   generating a finite state machine including one or more file states, the one or more file states including a file open state, a file read state, a file write state, a file read or write state, a file close state, or any combination thereof; and
   storing the one or more file states in the finite state machine in a key-value object store.

10. The method of claim 9, wherein de-duplicating the audit events comprises:
    identifying, as the unique file operations, file operations that maintain a file system state based at least in part on the finite state machine.

11. The method of claim 1, wherein determining that the pattern of instructions associated with the unique file operations are abnormal is based at least in part on:
    applying a set of machine learning models to the audit events,
    wherein the set of machine learning models are trained to determine the pattern of instructions associated with the unique file operations, and to compare the pattern of instructions to the normal pattern of instructions or a normal quantity of instructions based at least in part on features representing a normal or expected behavior of the file system.

12. The method of claim 1, wherein determining that the pattern of instructions associated with the unique file operations is abnormal is based at least in part on:
applying Seasonal-Trend Decomposition Procedure Based on Loess (STL) decomposition to the unique file operations to remove seasonal and trend components; and
performing an Exploratory Data Analysis (ESD) test on data that is based at least in part on a residue of the STL decomposition.

13. An apparatus, comprising:
at least one processor;
memory coupled with the at least one processor; and
instructions stored in the memory and executable by the at least one processor to cause the apparatus to:
access audit events in a file system for a time interval, the audit events including unique file operations and duplicative file operations within the time interval;
de-duplicate the audit events to obtain time series data that comprises the unique file operations and is devoid of the duplicative file operations from the audit events, the unique file operations being operations associated with respective changes in file states for corresponding files of the file system and the duplicative file operations being operations that maintain respective file states for corresponding files of the file system;
compare a pattern of instructions associated with the unique file operations of the time series data, the pattern of instructions associated with a quantity of the unique file operations occurring within a time period, to a normal pattern of instructions;
determine, based at least in part on the comparing, that the pattern of instructions associated with the unique file operations is abnormal based at least in part on a deviation between the pattern of instructions and the normal pattern of instructions; and
generate an alert based at least in part on determining that the pattern of instructions associated with the unique file operations is abnormal.

14. The apparatus of claim 13, wherein the audit events include information comprising, for each audit event, a user id, a file name, a type of access, a timestamp, or any combination thereof.

15. The apparatus of claim 13, wherein the instructions are executable by the at least one processor to cause the apparatus to determine that the pattern of instructions is abnormal based at least in part on determining that the unique file operations include instructions to encrypt one or more copies of at least one file.

16. The apparatus of claim 13, wherein, to determine that the pattern of instructions is abnormal, the instructions are executable by the at least one processor to cause the apparatus to:
determine that the unique file operations comprise a set of delete instructions that deviates from a normal pattern of delete instructions, a set of read instructions that deviates from a normal pattern of read instructions, a set of file access instructions that deviates from a normal pattern of file access instructions, or any combination thereof.

17. The apparatus of claim 16, wherein the instructions are executable by the at least one processor to cause the apparatus to determine that the set of delete instructions deviates from the normal pattern of delete instructions based at least in part on a quantity of delete instructions included in the set of delete instructions, that the set of read instructions deviates from the normal pattern of read instructions based at least in part on a quantity of read instructions included in the set of read instructions, or that the set of file access instructions deviates from the normal pattern or file access instructions based at least in part on a quantity of file access instructions included in the set of file access instructions.

18. The apparatus of claim 16, wherein the instructions are further executable by the at least one processor to cause the apparatus to:
identify a ransomware infection, one or more insider threats, a misappropriation of system credentials, or any combination thereof based at least in part on the set of delete instructions, the set of read instructions, the set of file access instructions, or any combination thereof.

19. The apparatus of claim 13, wherein the instructions are executable by the at least one processor to cause the apparatus to duplicate the audit events based at least in part on an identification of successive file operations that do not lead to a change in a file state.

20. A non-transitory computer-readable medium storing code, the code comprising instructions executable by at least one processor to:
access audit events in a file system for a time interval, the audit events including unique file operations and duplicative file operations within the time interval;
de-duplicate the audit events to obtain time series data that comprises the unique file operations and is devoid of the duplicative file operations from the audit events, the unique file operations being operations associated with respective changes in file states for corresponding files of the file system and the duplicative file operations being operations that maintain respective file states for corresponding files of the file system;
compare a pattern of instructions associated with the unique file operations of the time series data, the pattern of instructions associated with a quantity of the unique file operations occurring within a time period, to a normal pattern of instructions;
determine, based at least in part on the comparing, that the pattern of instructions associated with the unique file operations is abnormal based at least in part on a deviation between the pattern of instructions and the normal pattern of instructions; and
generate an alert based at least in part on determining that the pattern of instructions associated with the unique file operations is abnormal.

* * * * *